B. W. KADEL.
BRAKE ARRANGEMENT FOR CAR TRUCKS.
APPLICATION FILED AUG. 11, 1916.
1,305,468.
Patented June 3, 1919.
Fig. 1.
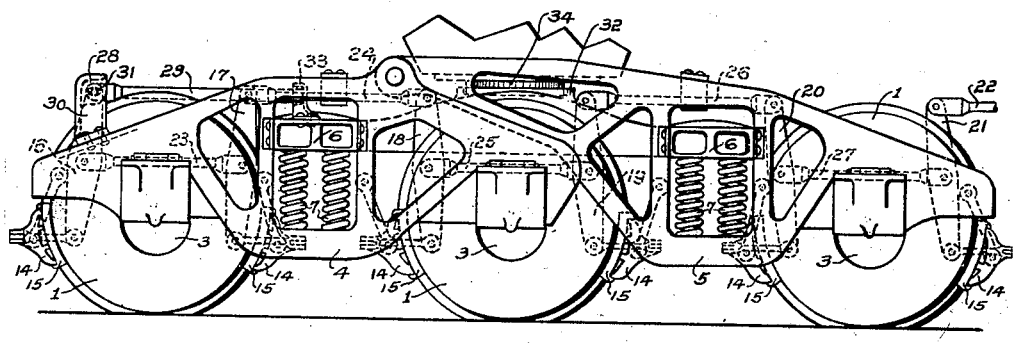
Fig. 2.
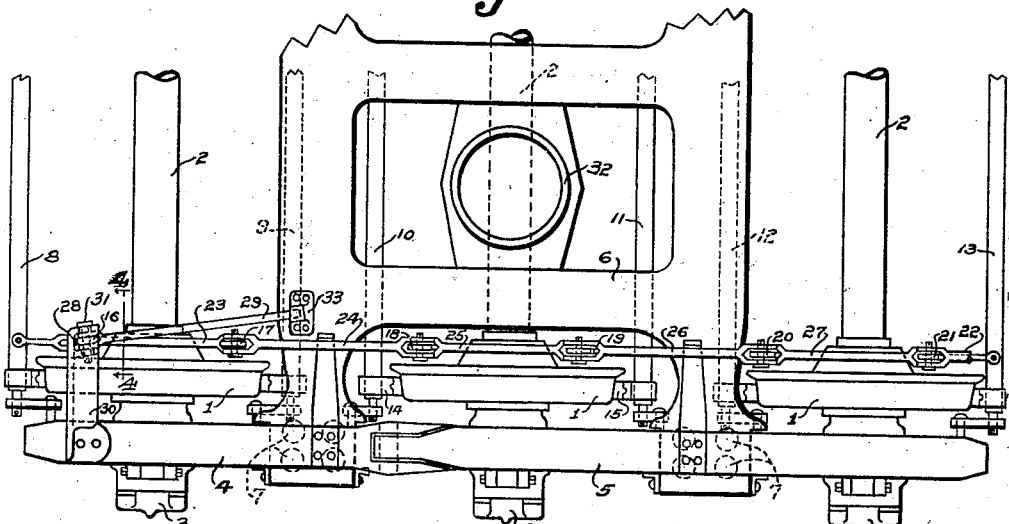
Fig. 3.
Fig. 4.
Inventor
Byron W. Kadel
Witness
Earl N. Fisher
J. N. Moseley

UNITED STATES PATENT OFFICE.

BYERS W. KADEL, OF ROANOKE, VIRGINIA, ASSIGNOR TO THE AMERICAN BRAKE COMPANY, OF ST. LOUIS, MISSOURI, A CORPORATION OF MISSOURI.

BRAKE ARRANGEMENT FOR CAR-TRUCKS.

1,305,468.

Specification of Letters Patent.

Patented June 3, 1919.

Application filed August 11, 1916. Serial No. 114,398.

*To all whom it may concern:*

Be it known that I, BYERS W. KADEL, a citizen of the United States, residing in the county of Roanoke and State of Virginia, have invented certain new and useful Improvements in Brake Arrangements for Car-Trucks, of which the following is a specification.

The present invention pertains to a brake mechanism for railway car trucks and the principal object thereof is to provide an arrangement of parts embodying means for delivering the brake lever reaction loads to the car body in a direct manner and without setting up undue stresses in other truck members.

With such object in view the invention consists of the formation, combination and arrangement of parts as will be herein described and particularly claimed.

In the drawings, Figure 1 is a side elevational view of a truck having applied thereto the features of my invention and Fig. 2 is a broken plan view of the same. Fig. 3 is a side elevational view of the outer end of the dead lever bracket, this figure being somewhat enlarged over Fig. 1. Fig. 4 is a fragmentary view showing in end elevation and substantially on the line 4—4, Fig. 2, the bracket for supporting the dead brake lever; this figure being drawn to the same approximate scale as Fig. 3.

In these drawings the truck, which is of the six wheel type, is shown as supplied with wheels 1, axles 2 and oil boxes 3. Resting on the oil boxes 3 are side frames 4 and 5. The load of the car body is supported upon a truck bolster 6 which extends through openings in the side frames and is supported upon the same, the springs 7 being interposed therebetween so as to allow a cushioned movement of the bolster relative to the wheels, etc.

The brakes supplied for this truck are of the "clasp" brake type, beams 8, 9, 10, 11, 12 and 13 being supplied, these each having heads 14 and shoes 15 of the customary construction which may be drawn firmly up against the treads of the wheels 1. Levers 16, 17, 18, 19, 20 and 21 are furnished, one for each brake beam, the beams being secured to the lower extremities of these levers by any suitable method. A lever actuating member 22 is affixed to the end live lever at its upper extremity and a pull on this rod will actuate the entire series of levers through the lever connecting members or rods 23, 24, 25, 26 and 27, the levers being in a progressive series, the brake shoes at each lever being firmly set against the wheels. The end lever 16 is what is commonly known as a "dead" lever; that is, it is pivoted as at 28 to some relatively fixed part of the truck at which point the reaction from the brake levers is manifested. The levers are positioned substantially in a common plane so that the axes of the rods are parallel, and are customarily located inside the lines of the truck wheels.

A similar series of levers and rods occurs at the opposite side of the truck (not shown in the drawings) and the lever actuating mechanism underneath the car body operates both lever systems in harmony.

The arrangement of truck parts and brakes so far explained is old and well known in the art and they have been set forth herein because of the relation they bear to my improvements which have to do with the forming of the pivot point 28 for the one extremity of the dead lever 16. There is frequently great difficulty experienced in securing a proper anchorage for the end of this lever because of the interference of other parts of the car or truck, or the magnitude of the forces to be cared for here.

To receive this force I provide a strut 29 with a jaw 29ª at its outer end. This jaw embraces the top of the lever and is in turn embraced by a larger jaw at the outer end of a bracket 30 and the pivot pin 31 passes through alined openings in all three of these members. The opening therefor in the bracket is elongated so that the brake lever reaction load will not be received by the bracket but will go directly through the strut 29. The bracket, however, supports the lever and the outer end of the strut and spaces and alines the lever and strut. It also takes up any lateral forces which may result from angularity of the parts. The bracket is secured to a portion of the truck that is fixed relative to the movable brake beams and levers, the side frame 4 being the customary element used for this purpose, the side frames being customarily located outside the lines of the truck wheels.

It has been customary to receive the brake lever reaction either upon the outer end of a similar bracket or upon a cross member of the truck frame passing along the end of the truck. By the use of the strut 29, however, I am enabled to relieve the side frames of this excessive load and the same is transmitted directly to the bolster 6 which in turn reacts against a fixed member such as the top center plate 34 on the car body through the truck center plate 32. The bolster, while movable upon the springs 7 is fixed longitudinally of the truck relative to the movable brake beams and levers.

In order to pass this strut 29 back to the bolster, it is preferably carried at an angle with the plane of the levers 16 and 17, or so that it passes adjacent to but out of the path of the lever 17. A bracket 33 is provided on the bolster against which the strut seats and to which the force is delivered. As the bolster may move vertically upon the springs 7 relative to the side frames and relative to the outer end of the strut 29, the seat of the inner end of the strut against the abutment 33 is such that a rocking motion may be had thereabout.

The portion of the bolster 6 that receives the force from the inner end of the strut 29 extends transversely of the truck between the outer and the middle axle and along the opposite side of the outer axle from the lever 16, the strut 29 passing over the outer truck axle.

My invention thus described is useful in connection with many forms of trucks.

What I claim is:

1. In a brake arrangement for car trucks, a plurality of brake beams with brake shoes mounted thereon, a system of levers for the actuation of the same, the said lever system including a live lever at one end of the truck and a dead lever at the opposite end, said levers being coupled together and there being suitable lever connecting members connecting the same together, a relatively fixed truck member with respect to which the said brake beams have movement, a lever supporting bracket secured to said truck member and extending therefrom to the dead point of the said dead lever, a second relatively fixed member adapted to seat against a fixed portion of the car body, and a load-carrying member extending from the dead point of the said dead lever to the said second fixed member and adapted to receive the brake reaction load therefrom.

2. In a brake arrangement for car trucks, a plurality of brake beams with brake shoes mounted thereon, a system of levers for the actuation of the same, the said lever system including a live lever at one end of the truck and a dead lever at the opposite end and intermediate live levers, said levers being coupled together in a progressive series and there being suitable lever-connecting members connecting the same together, a relatively-fixed truck member with respect to which the said brake beams and levers have movement, a bracket secured to said truck member and extending therefrom to the dead point of the said dead lever and spacing the same, a second relatively-fixed member adapted to seat against a fixed portion of the car body, and a load-carrying member extending from the dead point of the said dead lever to the said second fixed member and adapted to transfer the brake reaction load from the said dead lever thereto.

3. In a brake arrangement for car trucks, a plurality of brake beams with brake shoes mounted thereon, a system of levers for the actuation of the same, the said lever system including a live lever at one end of the truck and a dead lever at the opposite end and intermediate live levers, said levers being coupled together in a progressive series and there being suitable lever-connecting members connecting the same together, a relatively-fixed truck member with respect to which the said brake beams and levers have movement, a bracket secured to said truck member and extending therefrom to the dead point of the said dead lever and spacing and supporting the same, a second relatively-fixed member adapted to seat against a fixed portion of the car body, and a load-carrying member extending from the dead point of the said dead lever to the said second fixed member and adapted to transfer the brake reaction load from the said dead lever thereto, the dead lever being secured to the said bracket in such manner as to prevent the delivery thereto of the brake reaction load.

4. In a brake arrangement for car trucks, a plurality of brake beams with brake shoes mounted thereon, a system of levers for the actuation of the same, the said lever system including a live lever at one end of the truck and a dead lever at the opposite end and intermediate live levers, said levers being coupled together in a progressive series and there being suitable lever-connecting members connecting the same together, a relatively-fixed truck member with respect to which the said brake beams and levers have movement, a bracket secured to said truck member and extending therefrom to the dead point of the said dead lever, the said bracket being formed to space the said dead lever and support the same vertically, a second relatively-fixed member adapted to seat against a fixed portion of the car body, and a load-carrying member extending from the dead point of the said dead lever to the said second fixed member and adapted to transfer the brake reaction load from the said dead lever thereto, the dead point of the dead lever, the end of the said bracket and the end of the said load-carrying member being connected together in such manner that the dead lever may have pivotal movement with respect to the other two and that the bracket will not receive the direct force of the brake reaction load.

5. In a brake arrangement for car trucks, a plurality of brake beams with brake shoes mounted thereon, a system of levers for the actuation of the same, the said lever system including a live lever at one end of the truck and a dead lever at the opposite end and intermediate floating levers, said levers being coupled together in a progressive series and there being suitable lever-connecting members connecting the same together, a relatively-fixed truck member with respect to which the said brake beams and levers have movement, a bracket secured to said truck member and extending therefrom to the dead point of the said dead lever and spacing the same, a second relatively-fixed member adapted to seat against a fixed portion of the car body, and a load-carrying member extending from the dead point of the said dead lever to the said second fixed member and adapted to transfer the brake reaction load thereto, the said levers being located substantially in a vertical plane and the axis of the said load-carrying member lying external of that plane for a portion of its length.

In testimony whereof I affix my signature in presence of two witnesses.

BYERS W. KADEL.

Witnesses:
S. H. BARNHART,
W. B. KERR.